Sept. 14, 1954 C. L. ZAKHARTCHENKO 2,689,011
HELICOPTER ROTOR CONSTRUCTION
Filed Feb. 9, 1948 4 Sheets-Sheet 1
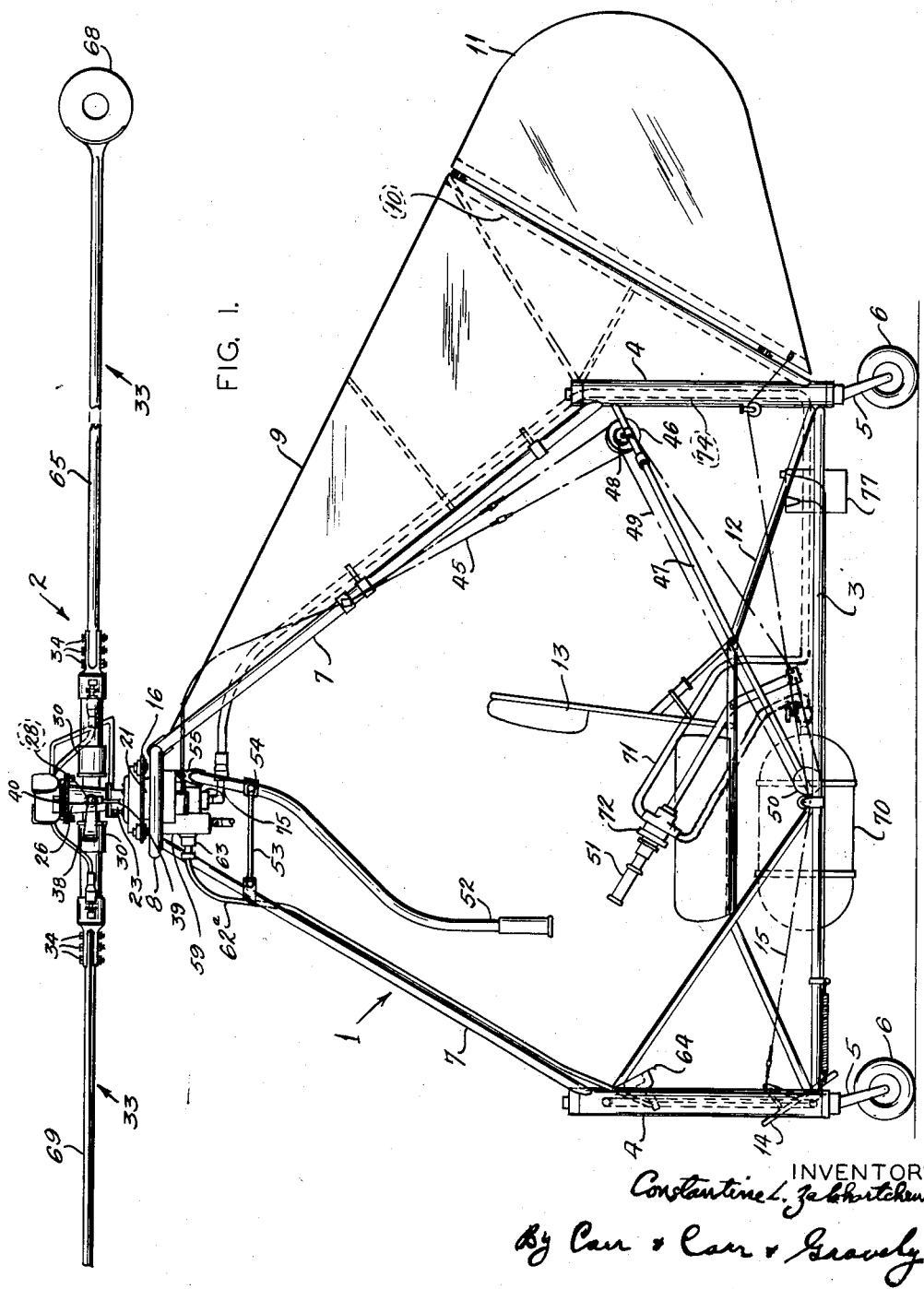
FIG. I.
INVENTOR:
Constantine L. Zakhartchenko,
By Carr & Carr & Gravely,
HIS ATTORNEYS.

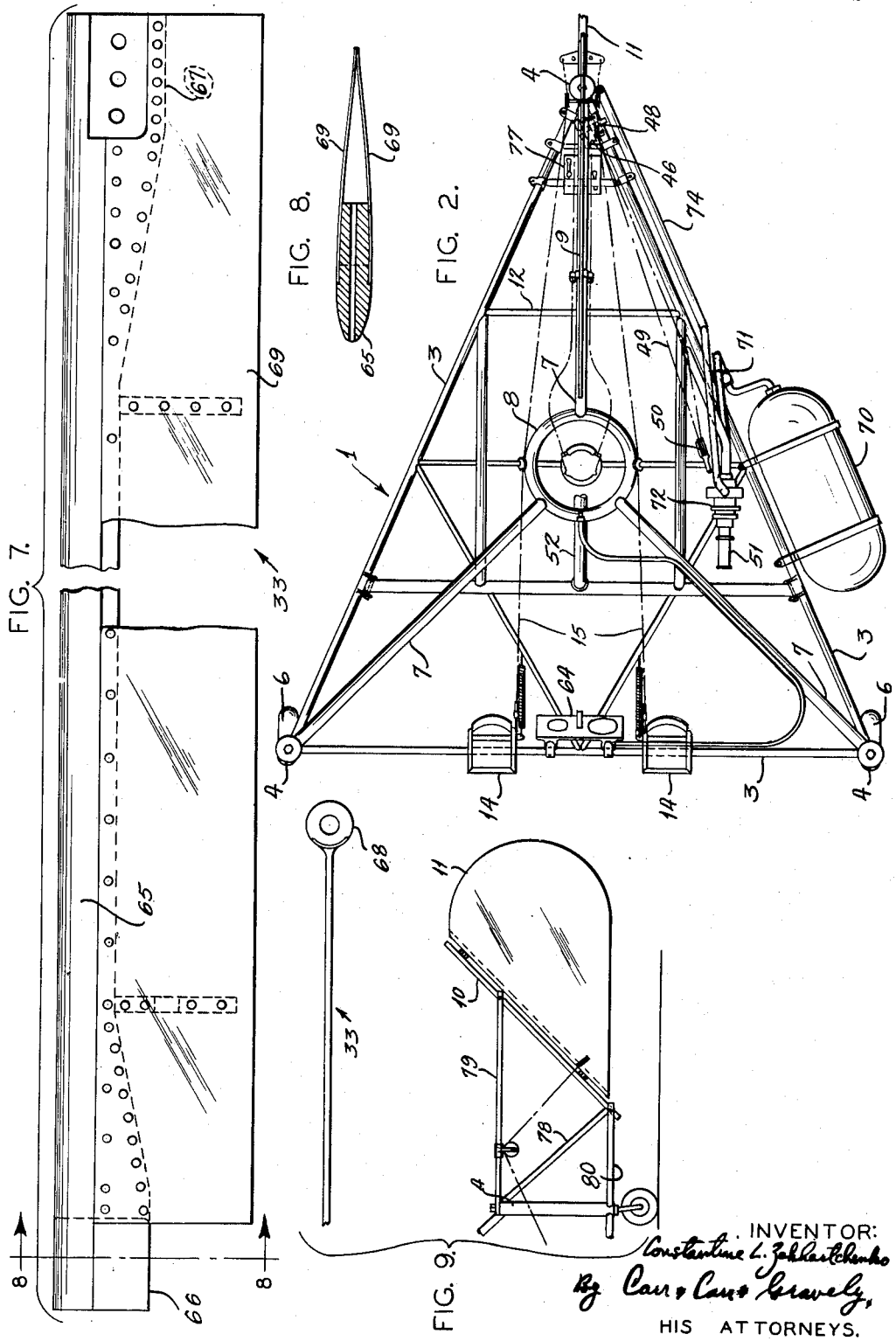

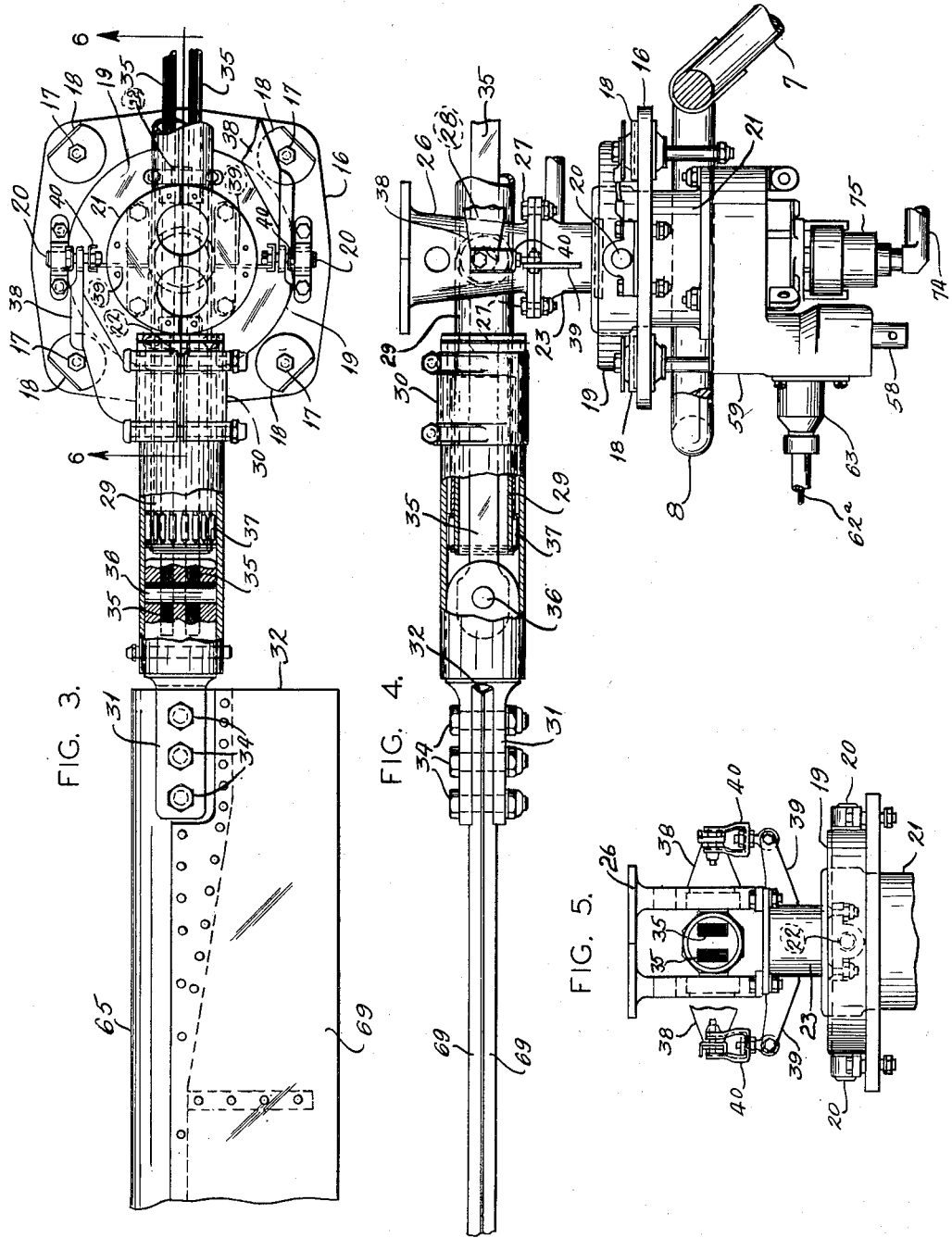

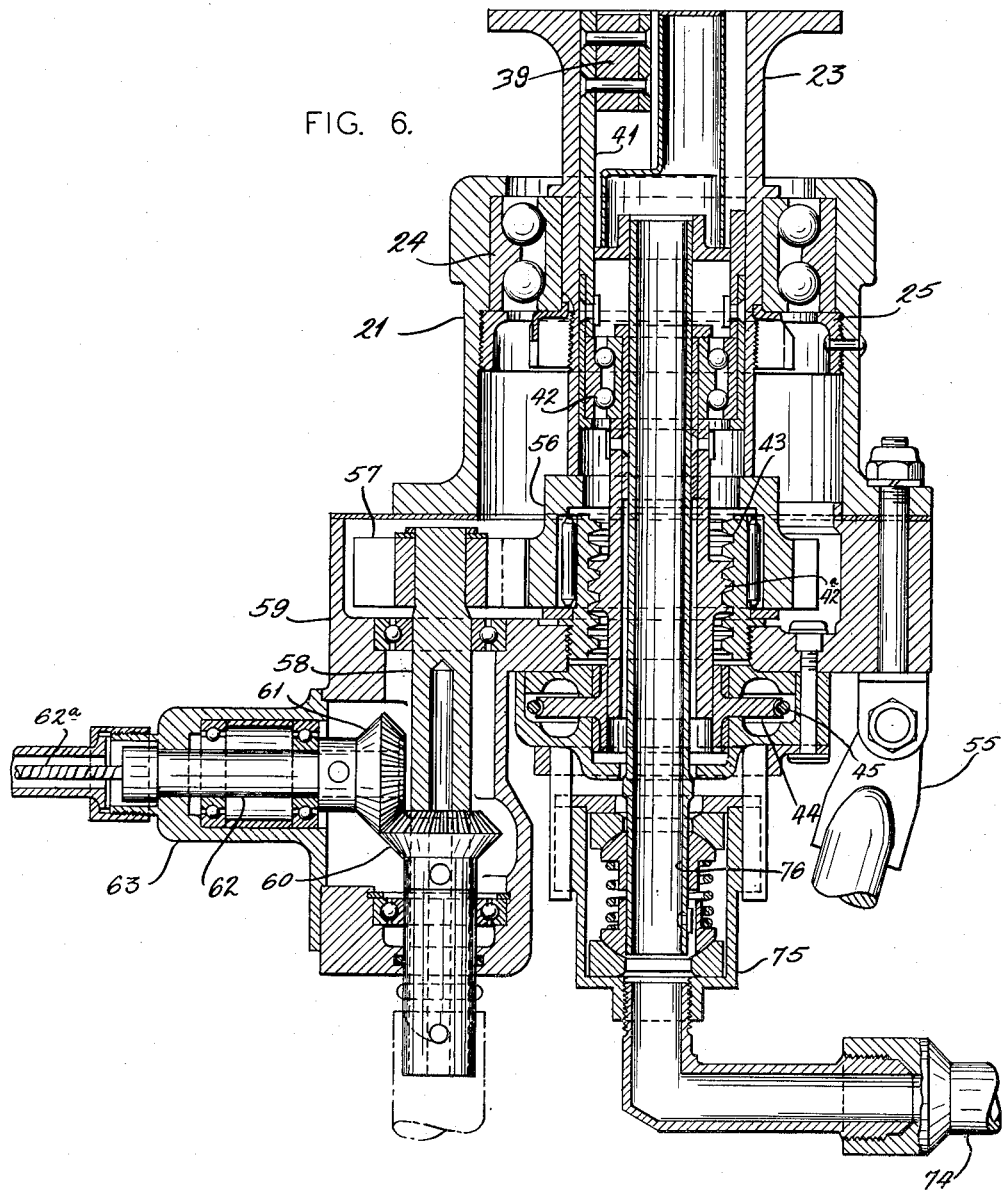

Patented Sept. 14, 1954

2,689,011

UNITED STATES PATENT OFFICE 2,689,011

HELICOPTER ROTOR CONSTRUCTION

Constantine L. Zakhartchenko, St. Louis, Mo., assignor to McDonnell Aircraft Corporation, St. Louis, Mo., a corporation of Maryland Application February 9, 1948, Serial No. 7,129

7 Claims. (Cl. 170—160.27)

This invention relates to helicopters and is more particularly directed to a helicopter construction wherein the sustaining and propelling rotor is driven by jet propulsion devices mounted on the blades thereof.

An object of the invention is to provide in a helicopter rotor, a rigid connection between the rotor blades and the blade supporting member in one plane but which will permit relative motion between the blades and the supporting member in a plane displaced 90° therefrom.

Another object of the invention is to provide an improved rotor blade structure that will, in cooperation with the ram jet engine mounted on the outboard ends of the rotor blades, produce a more stabilized action of the rotor while it is rotating.

Still another object of the invention is to provide a simplified rotor supporting means whereby forward, reverse, or sidewise fuselage motion may be more easily accomplished or a hovering of the helicopter over any particular location.

Yet another object of the invention is to provide a simplified supporting structure for a helicopter rotor that will enable the pilot to adjust the plane of rotation of the rotor to any desired position and to hold it in that selected position.

In the drawings:

Fig. 1 is a side elevational view of the helicopter;

Fig. 2 is a plan view of the passenger carrying compartment in the air frame with the rotor removed;

Fig. 3 is a plan view of the rotor and the support therefor;

Fig. 4 is a side elevational view thereof;

Fig. 5 is an end elevational view of the rotor support with the rotor blade removed;

Fig. 6 is a section view taken along the line 6—6 of Fig. 3;

Fig. 7 is a plan view of one of the rotor blades;

Fig. 8 is a section view taken along the line 8—8 of Fig. 7, and

Fig. 9 is an elevational view of a modified rudder support.

Referring now to the drawings, numeral 1 generally indicates a fuselage frame for a helicopter and 2 generally indicates the rotor assembly therefor. The skeleton only of the fuselage is illustrated which is intended to be enclosed by any suitable structural material such as a transparent glass-like material, or other desirable thin section material. The fuselage skeleton is made up of a plurality of horizontal members 3 to form a triangular base. At each apex of the triangle there is a tubular column 4 to which the ends of members 3 are secured. Suitable spindles 5, forming part of the landing gear shock absorbing system are rotatably supported in the tubular members 4 and appropriate wheels 6 are rotatably mounted in the forked lower ends of the spindle to enable the fuselage to be guided over the ground surface. A gantry construction is provided comprising tubular members 7 which are secured at one of their ends to the columns 4 and their other ends are secured to rotor supporting ring 8 on which the rotor 2 is suitably rotatably supported by mechanism to be subsequently described. An empennage 9 may be provided which is preferably in the form of a stationary membrane or surface supported on one of the gantry members 7 and at its rearward edge is provided with a stiffening member or hinge tube 10 that is suitably secured at its one end to one of the column members 4. A rudder 11 is hinged to the member 10 on an angle to the vertical so that it moves in two different planes for the purpose of assisting in steering the helicopter and in rotating the fuselage relative to the rotor.

The most satisfactory operation of the rudder is accomplished when it is positioned relative to the rotor so that the rudder centroid is located between 70% to 90% of the rotor blade radius span. The reason for locating the centroid of the rudder surface at 70% to 90% of the rotor blade radius is to utilize the maximum downwash velocity of the rotor. The downwash velocity of air from the rotor is maximum at from 70% to 90% of its length and the rudder action will be the most sensitive when its surface centroid is located at the position of maximum downwash velocity.

When jet engines are employed to operate the rotor, there is no torque reaction on the fuselage except for friction that may exist in the rotor thrust bearings as well as any thrust that may be imparted to the fuselage by the drive shafts leading from the rotor mechanism to rotor driven instruments on the instrument panel. For this reason, control of the rudder in at least two different planes is required in order to secure the necessary reaction between rotor 2 and rudder 11 so that the fuselage will be easily rotatable relative to the rotor at the election of the pilot. The reason for rotating the fuselage is to enable the pilot to quickly position it so that it will be pointed in the desired direction of travel, thereby avoiding the necessity of flying the helicopter through a wide arc in order to point the fuselage in said desired direction of travel.

A chair 13 is supported on chair supporting frame 12 that is secured to the members 3, as illustrated in Figs. 1 and 2.

The control for the rudder consists of two pivotally supported foot pedals 14 which have linkages 15, 15 connected thereto at one of their ends and whose other ends are connected to opposite sides of the rudder 11 so that it will be under the control of the pilot at all times.

The rotor 2 is rotatably supported in a gimbal mechanism which comprises a first ring 16 that is secured to ring 8 of the gantry by a plurality of screws 17 provided with suitable resilient members 18 so as to absorb shock or vibration and prevent its transmittal from the rotor to the fuselage or vice versa. Concentrically disposed within the ring 16 is a second ring 19 that is pivotally secured to ring 16 by pins 20 to enable the ring 19 to pivot with respect thereto about the axis through the pins 20. Concentrically disposed within the ring 19 is a housing 21 that is pivotally secured to the ring 19 by means of pins 22 that are secured at one of their ends to the housing 21 and at their opposite ends are journaled in suitable bearings supported on the ring 19. This structure thus far is a conventional gimbal ring construction to enable tilting to take place in two different angularly related planes.

The rotor 2 is supported in the housing 21 on a shaft 23 that is rotatably supported therein by means of anti-friction bearing 24, the bearing being suitably retained and locked in the housing 21 by retaining member 25. Superimposed on the shaft 23 is a perch 26, the latter being appropriately secured to the shaft by a plurality of bolts 27. The rotor 2 is tiltably supported in the perch 26 on a pin 28, the pin being associated with a housing 29 in which the blades are secured. A sleeve 30 is supported on each end of the housing 29 and a blade supporting member 31 is supported in the outer end of each of the sleeves. The blade supporting member 31 is forked at its exposed end in which fork the inboard end 32 of the rotor blade 33 is inserted and held therein by a plurality of securing means such as bolts 34. The other sleeve 30 supports a companion rotor blade and the two blades are connected together by a linkage which comprises a pair of flexible members 35, each of which is preferably made up of a plurality of sheet metal strips that are connected to the blade supporting members 31 by appropriate pins 36. The reason for the flexible connection between the rotor blades 33 is that they may be permitted to twist or rotate with respect to member 29 and this rotative motion is facilitated by bearings 37 disposed between sleeve 30 and the member 29. By twisting or rotating the blades relative to each other on their longitudinal axes, they may be adjusted to the proper pitch to thereby increase or decrease the lifting ability of the rotor. The links 35 provide the necessary flexibility between the blades and yet provide sufficient mechanical strength to hold the two blades in assembled relationship while allowing them to be rotatably adjusted on an axis that is radial to shaft 23. The pitch of the blades, as set forth above, is adjusted by rotating or twisting them on their own longitudinal axes relative to each other and is accomplished by providing each sleeve 30 with an arm 38 that is connected to oppositely disposed arms 39 by a jointed linkage 40. Each arm 39, as seen in Fig. 6, is connected to an axially movable sleeve member 41 disposed within the shaft 23. The sleeve 41 comprises two portions operatively associated with each other through a plurality of bearings 42 so as to provide a rigid connection therebetween and a thread 42a is formed on one portion of the sleeve that engages a nut 43. A gear 44 is arranged at the extreme lower end of the sleeve 41 about which a cable 45 is led whose ends are connected together and which operates through suitable tubing in a manner well known to the art. This cable at the point where it engages the gear 44 may have formations thereon that mesh with complemental impressions in the gear 44 so as to prevent relative motion between them. The cable 45 leads about a sheave 46 that is rotatably secured to a tube 47 disposed between one of the columns 4 and one of the tube members 3. A second sheave 48 is associated with sheave 46 and has a cable 49 led around it which is also led around another sheave 50 rotatably supported on one of the frame members 3. The sheaves 46 and 48 are different sizes so as to increase the mechanical advantage. A control lever 51 is pivotally associated with the chair supporting frame 12 and at its lower end, as viewed in Fig. 1, has the ends of cable 49 secured thereto. In each of these cables suitable turnbuckles or other structures may be inserted so as to maintain the cables taut at all times. It should be apparent, therefore, that as control lever 51 is pivoted with respect to frame 12, the cables 45 and 49 will move about their sheaves and since cable 45 is led around gear 44, it will rotate the threaded sleeve 42 in the nut 43 so as to impose an axial motion thereon, which axial motion will change the pitch of the rotor blades.

The rotor blade assembly tilts about pin 28. This motion is not subject to the pilot's control but the tilted position of the rotor about the pin is such that it assumes its most efficient position.

The plane in which the rotor 2 rotates is controlled by a lever 52 which is pivoted to an auxiliary frame 53 that is secured to one or more of the gantry members 7, there being a conventional ball and socket pivot 54 to provide this motion. The upper end of the lever 52 is pivotally securing to housing 21 at 55. The purpose of the frame 53 is to enable the experienced pilot to tilt the rotor 2 in such a manner that movement will be imposed on the vehicle in the direction in which lever 52 is moved. Were this structure 53 not provided, the lever 52 would have to be moved oppositely to the direction in which the vehicle is to go.

The lever 52 pivots the housing 21 about the several pivots 20 and 22 in the gimbal ring assembly and by holding the lever 52 in any desired position, the plane in which the rotor rotates will be determined.

Power takeoffs are provided for an instrument panel which consists of a gear 56 secured to the shaft 23 that meshes with a gear 57 secured to one end of a shaft 58. Shaft 58 is rotatably supported in suitable bearings in a projection 59 formed on the housing 21 and near its lower end is provided with a gear 60 that meshes with another gear 61 secured to a shaft 62 rotatably supported in a housing or bracket 63. The shaft 62 is coupled to a flexible shaft 62a that leads to suitable instruments on an instrument panel 64 carried by one of the column members 4 of the fuselage skeleton. A suitable crank or starter to initiate blade rotation is connectable to the lower end of shaft 58.

The rotor blades 33 consist of a solid section 65 that is enlarged at the outboard end as at 66 which end is forked and machined so as to receive a suitable bracket on a ram jet engine 68. The inboard end is also enlarged as at 67 and is suitably shaped so as to receive the blade supporting member 31 which also constitutes a concentrated weight or mass along with the enlarged inboard end of the blade. An engine is mounted on the outboard end of each of the rotor blades. The solid portion 65 of the blade is contoured over its entire length to form the leading edge thereof and the trailing edge of the blade is made up of two thin section material members 69 secured in recesses in the solid member 65. One longitudinal edge of each of members 69 is laid in the recesses and the opposite longitudinal edges are secured together, thereby forming the trailing edge of the blade. This provides a suitably balanced blade construction that is light in weight and yet of sufficient mechanical strength to sustain the centrifugal action of the ram jet engine mounted on the outboard end thereof. The centrifugal action of the ram jet engine prevents bending or bowing of the rotor blades upwardly during rotation and tends to make them operate in a uniform plane radial to shaft 23. In such instances as where the motive power is derived from a source not supported on the rotor blades, the same effect is produced by weighting the outboard ends of the rotor blades so that the centrifugal action thereof as the rotor rotates will tend to prevent the bowing of the rotor blades. The blade, therefore, can be made of a much more flexible and light weight construction by reason of the centrifugal action.

The fuel supply for the ram jet engines is derived from a source 70 appropriately secured to one of the frame members 3 and is then led by means of a conduit 71 to a control valve 72 associated with the control lever 51. It is then led to a conduit 74 which at its upper end forms one part of a rotary coupling 75. The purpose of this rotary coupling is to permit relative rotation between the conduit 74 and a conduit 76 disposed within the shaft 23. The conduit 76 extends through the bearings 42 so as to allow relative rotative motion between the conduit and the shaft and is then connected to suitable conduits (not shown) that lead to each of the ram jet engines 68 through the hollow rotor blades 33. Each of the engines is provided with an ignition means such as a spark plug and the wiring therefor is also disposed within the hollow rotor blades. A suitable source of electrical energy for ignition and instrument purposes, such as a battery 77, is also carried in the fuselage and is suitably connected to the instrument panel and to the ignition by suitable cables.

Fig. 9 shows a modified rudder assembly in which frame members 80, 78, and 79 are disposed between one of the column members 4 and the hinge tube 10 and rudder 11. The location of the centroid of rudder surface 11 is preferably disposed between 70% and 90% of the blade span. The operation and function of the rudder is identical with that set forth above.

What I claim is:

1. A supporting mechanism for a helicopter rotor comprising a housing; a shaft rotatably supported in said housing; a rotor assembly consisting of a pair of diametrically disposed blades and a perch fixed to said shaft and pivotally supporting said blades for rocking movement about an axis normal to and intersecting the axis of said shaft; bearing means supporting said blades for rotation about the longitudinal axes thereof; a plurality of torsionally flexible elements connecting said blades to hold the blades against centrifugal forces of rotation; a sleeve in said shaft; linkage means connected between each blade and said sleeve on opposite sides thereof; and means for moving said sleeve axially of said shaft for varying the pitch of said blades.

2. A supporting mechanism for a helicopter rotor comprising a housing; a shaft rotatably mounted in said housing, a sleeve disposed for sliding movement axially of said shaft; a rotor assembly consisting of a pair of diametrically disposed blades mounted on said shaft, torsionally flexible, longitudinally inelastic means connecting said blades together so as to permit relative rotation of said blades and resist axial separation under centrifugal force; bearings supported on said shaft for rotatably receiving said blades for permitting same to rotate about their longitudinal axes; a nut supported in said housing; a thread on said sleeve engageable with said nut; means for rotating said sleeve for axially moving same through said nut and in said shaft; and linkage means connected between said sleeve and said rotor blades for rotating the blades about their longitudinal axes whereby the pitch of each blade is varied.

3. A supporting mechanism for a helicopter rotor comprising a housing to be supported on a helicopter fuselage; a shaft rotatably mounted in said housing, a sleeve disposed for sliding movement axially within said shaft; a rotor assembly consisting of a pair of diametrically disposed blades mounted on said shaft; a plurality of thin sheet metal elements flexibly connecting said blades for permitting same to be rotated relative to each other but retained against axial separation; bearing means supported by said shaft for permitting said blades to be rotated about their longitudinal axes; means for causing said sleeve to be moved axially of said shaft; means for actuating said last mentioned means; and linkage means connecting said sleeve and each of said blades so that the pitch of the blades may be varied as the sleeve is moved axially of said shaft.

4. A supporting mechanism for a helicopter rotor comprising a housing; a shaft rotatably mounted in said housing; a rotor assembly consisting of a pair of diametrically disposed blades mounted on said shaft; means connected between said blades including two groups of torsionally flexible laminated strips for permitting relative rotation of said blades; horns secured to said blades at the roots thereof; a sleeve slidably mounted in said shaft; linkage disposed on each side of said sleeve and connected between said sleeve and each of said horns; rotatable means in said housing operatively associated with said sleeve for causing the sleeve to be moved axially of said shaft for varying the pitch of the blades; and means for actuating said rotatable means.

5. A helicopter comprising in combination a fuselage, a gimbal mechanism mounted on said fuselage, a first housing pivotally connected to said gimbal mechanism for tilting movement relative to said fuselage, a shaft rotatably carried in said first housing with an outer exposed end, a perch on said outer exposed end of said shaft, a second housing pivotally carried in said perch and extending normal to said shaft axis with free ends on opposite sides of said perch, rotor blades disposed adjacent each free end of said second housing, sleeve connector means attaching each rotor blade to the adjacent free end of said second housing for rotation about the longitudinal axis of said rotor blades, a plurality of flexible elements extending through said second housing and connected adjacent their opposite ends to said rotor blades for retaining said rotor blades against separation while permitting relative rotation of the rotor blades relative to said second housing for rotor blade pitch adjustment, a rotor blade pitch control arm fixed to each sleeve connector means, linkage means connected to each said control arm, rotor blade pitch control means movably mounted in said first housing and connected to said linkage means, and a pilot control lever in said fuselage operatively connected with said rotor blade pitch control means in said first housing for changing the pitch of said rotor blades.

6. The combination set forth in claim 5, wherein said rotor blade pitch control means in said first housing includes a sleeve member movable in said first housing, screw threads on said sleeve member, a complementary nut fixed in said first housing to engage said screw threads, and a gear fixed to said sleeve member for rotating said sleeve member relative to said fixed nut for displacing said sleeve member to change the pitch of said rotor blades in response to pilot control lever operation.

7. The combination set forth in claim 5, wherein said second housing and said rotor blade sleeve connector means are rigid members adapted to confine said rotor blades to conjoint tilting movement in a plane normal to the axis of pivotal movement of said second housing relative to said perch, and a second pilot control lever in said fuselage operatively connected with said gimbal mechanism for tilting said housing and shaft to select the plane in which said rotor blades rotate to control the flight direction of the helicopter.

References Cited in the file of this patent

UNITED STATES PATENTS

| Number | Name | Date |
|---|---|---|
| 1,203,557 | Gallaudet | Oct. 31, 1916 |
| 1,919,586 | Dodge | July 25, 1933 |
| 2,041,787 | Stalker | May 26, 1936 |
| 2,142,601 | Bleecker | Jan. 3, 1939 |
| 2,264,942 | Larsen | Dec. 2, 1941 |
| 2,318,260 | Sikorsky | May 4, 1943 |
| 2,330,842 | Pullin | Oct. 5, 1943 |
| 2,369,652 | Avery | Feb. 20, 1945 |
| 2,383,139 | McGuire | Aug. 21, 1945 |
| 2,402,349 | Sikorsky | June 18, 1946 |
| 2,415,148 | Sikorsky | Feb. 4, 1947 |
| 2,418,030 | Hirsch | Mar. 25, 1947 |
| 2,426,130 | Wald | Aug. 19, 1947 |
| 2,429,646 | Pullin | Oct. 28, 1947 |
| 2,446,266 | Cummings | Aug. 3, 1948 |
| 2,457,429 | Young | Dec. 28, 1948 |
| 2,460,351 | Hoffman et al. | Feb. 1, 1949 |
| 2,466,821 | Owen | Aug. 12, 1949 |
| 2,485,502 | McCollum | Oct. 18, 1949 |
| 2,491,733 | Hiller | Dec. 20, 1949 |

FOREIGN PATENTS

| Number | Country | Date |
|---|---|---|
| 528,046 | Great Britain | Oct. 22, 1940 |